G. W. SHEELEY.
VALVE FOR AIR TUBES.
APPLICATION FILED SEPT. 29, 1921.
1,437,454.
Patented Dec. 5, 1922.
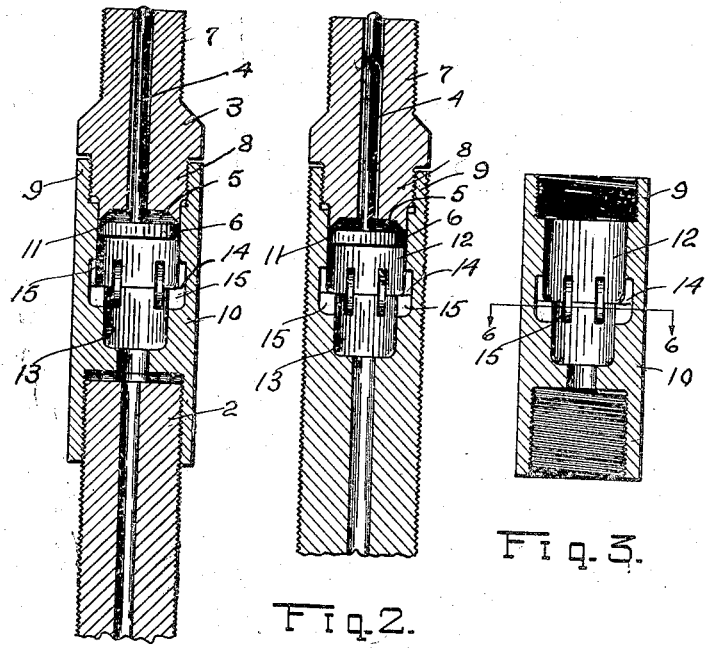
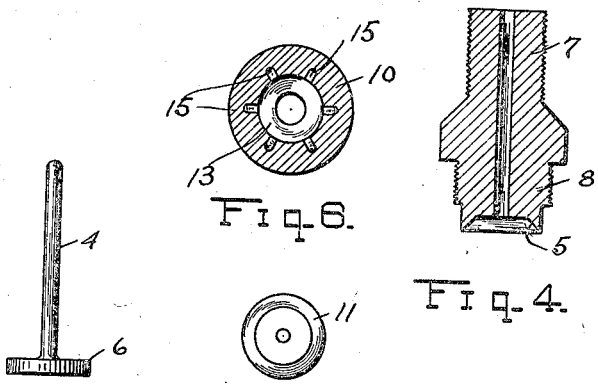
Inventor
G. W. Sheeley
By A. P. Greeley
Attorney Patented Dec. 5, 1922.

1,437,454

UNITED STATES PATENT OFFICE.

GEORGE W. SHEELEY, OF FREDERICK, MARYLAND.

VALVE FOR AIR TUBES.

Application filed September 29, 1921. Serial No. 504,195.

*To all whom it may concern:*

Be it known that I, GEORGE W. SHEELEY, a citizen of the United States, residing at Frederick, in the county of Frederick, State of Maryland, have invented certain new and useful Improvements in Valves for Air Tubes, of which the following is a specification, reference being had to the accompanying drawings, forming a part hereof.

My invention relates to valves for air tubes, and is particularly intended for use in connection with the air tubes of pneumatic tires for automobiles and the like, and has for its object to provide a device of this class which will be simple and inexpensive to construct, which will permit free entrance of air under pressure to inflate the tire and will close at once when the ingoing pressure is relieved so that the back pressure exceeds it. A further object of the invention is to provide a device of this class in which all operations necessary to the interior construction of the inner member of the valve tube may be effected from the outer end so that such inner member may be formed in one piece with the air inlet tube. A further object of the invention is to provide a device of this class in which the use of springs is dispensed with and in which a valve gasket of material not affected by oil may be used.

With the above described objects, and other objects hereinafter described, in view, my invention consists in the construction and combination of elements hereinafter described and claimed.

Referring to the drawings:

Figure 1 is a longitudinal central sectional view of an air inlet tube having applied thereto a valve tube embodying my invention.

Fig. 2 is a similar view showing a construction in which the inner member of the valve tube is formed integral with the air inlet tube.

Fig. 3 is a longitudinal central sectional view of the inner member of the valve tube.

Fig. 4 is a longitudinal central sectional view of the outer member of the valve tube.

Fig. 5 is a side view of the valve and valve rod.

Fig. 6 is a cross sectional view on line 6—6 of Figure 3, and

Fig. 7 is a top view of the gasket for the valve.

In the drawing 1 indicates the air inlet tube of the inner tube of a pneumatic tire having at its outer end the screw-threaded portion 2 to receive the valve tube carrying an inwardly opening valve, screw-threaded at its outer end to receive the usual coupling of the pump or air hose through which air is forced to inflate the inner tube.

This valve tube comprises an outer member 3 having an opening through it for the valve stem 4 and a valve seat 5 at its lower end for the valve 6, and is exteriorly screw-threaded at its outer end 7 to receive the coupling of the pump or air tube by which air is supplied to inflate the tire, and is screw-threaded at its inner end at 8 to fit into the screw-thread 9 on the outer end of the inner member 10. The valve seat 5 is preferably formed slightly conical as shown. The valve 6 is preferably a flat disk and is provided with a gasket 11 carried on the valve stem 4, preferably of leather, adapted to fit into the valve seat.

The inner member 10 of the valve tube is chambered out from its outer end of a diameter just sufficient to permit the valve disk 6 to play freely in it, as shown at 12, to a point about four times the thickness of the valve disk from the valve seat 5, and from this point is bored out of a diameter considerably less than the diameter of the valve disk, as shown at 13, so as to form a shoulder or seat 14 against which the edges of the valve disk will rest when the valve is forced inward by air pressure. In the wall of this inner member are formed three or more by-pass grooves 15, extending from the bored out portion 12 of relatively large diameter into the bored out portion 13 of relatively small diameter, through the shoulder or seat 14, these by-pass grooves being of such length that when the valve disk is against the shoulder or seat 14, their outer ends will be sufficiently above the outer face of the gasket 11, to permit free flow of air through them.

The combined cross-sectional area of these by-pass grooves 15 is less than half the cross-sectional area of the bored out portion 13 so that when the pressure from the interior of the tire exceeds the pressure from the pump the area of the valve disk exposed to the outward pressure exceeds the area of the passages through which the pressure may escape, with the result that the valve disk is forced outward past the outer ends of the by-pass grooves. As soon as it passes the outer ends of the by-pass grooves, the valve disk is subjected to the full outward pressure and is forced outward against the valve seat 5.

The inner member of the valve tube may, if preferred, be formed integral with the air inlet tube 1 as the portions 12 and 13 may be readily bored out from the outer end, and the by-pass grooves may also be formed from the outer end.

After the tire is inflated to the required pressure and the air pump disconnected, the usual protecting cap, not shown, should be screwed onto the outer end of the outer member 3.

By the use of the flat valve disk 6 and the slightly conical valve seat 5, it is made possible to use a relatively thin gasket 11 of leather or other material not affected by oil as a rubber gasket would be.

While the device of my invention is particularly adapted and intended for use in connection with the air inlet tubes of pneumatic tires, it may, of course be used in connection with air inlet tubes of other inflatable devices.

Having thus described my invention what I claim is:

1. In a valve tube the combination with an outer member having an opening through it and a valve seat at its inner end, a valve adapted to fit the valve seat and having its stem extending into the opening in the outer member, of an inner member having a chamber at its outer end of sufficient diameter only to permit the valve to move freely therein in contact with its walls and having at the inner end of said chamber opposite the valve seat and at a distance therefrom exceeding the thickness of the valve, a seat or shoulder adapted to serve as a stop for the valve, and a by-pass groove in the wall of the inner member extending through said seat or shoulder having its outer end at a substantial distance from the valve seat.

2. In a valve tube the combination with an outer member having an opening through it and a valve seat at its inner end, a disk valve adapted to fit the valve seat and having its stem extending into the opening in the outer member, of an inner member having a chamber at its outer end of sufficient diameter only to permit the valve to move freely therein in contact with its walls and having at the inner end of said chamber opposite the valve seat and at a distance therefrom exceeding the thickness of the valve, a seat or shoulder adapted to serve as a stop for the valve, and a by-pass groove in the wall of the inner member extending through said seat or shoulder, the outer end of the by-pass being at a distance from the seat or shoulder greater than the thickness of the valve.

3. In a valve tube the combination with an outer member having an opening through it and a valve seat at its inner end, a valve adapted to fit the valve seat and having its stem extending into the opening in the outer member and having its inner face flat, of an inner member having a chamber at its outer end of sufficient diameter only to permit the valve to move freely therein in contact with its walls, and having at the inner end of said chamber opposite the valve seat and at a distance therefrom exceeding the thickness of the valve, a seat or shoulder adapted to serve as a stop for the valve, and by-pass grooves in the wall of the inner member extending through said seat or shoulder, the outer ends of said by-pass grooves being at a substantial distance from the valve seat and combined cross-sectional area of the by-pass grooves being less than one half the area of the inner face of the valve.

4. In a valve tube the combination with an outer member having an opening through it and a conical valve seat at its inner end, a disk valve adapted to fit the valve seat having its stem extending into the opening in the outer member and provided on its outer face with a gasket, of an inner member having a chamber at its outer end of sufficient diameter only to permit the valve to move freely therein in contact with its walls, and having at the inner end of said chamber opposite the valve seat and at a distance therefrom exceeding the thickness of the valve, a seat or shoulder adapted to serve as a stop for the valve, and by-pass grooves in the wall of the inner member extending through said seat or shoulder, the outer ends of said by-pass grooves being at a distance from the seat or shoulder greater than the thickness of the valve.

In testimony whereof I hereunto affix my signature.

GEO. W. SHEELEY.